Figure 1:
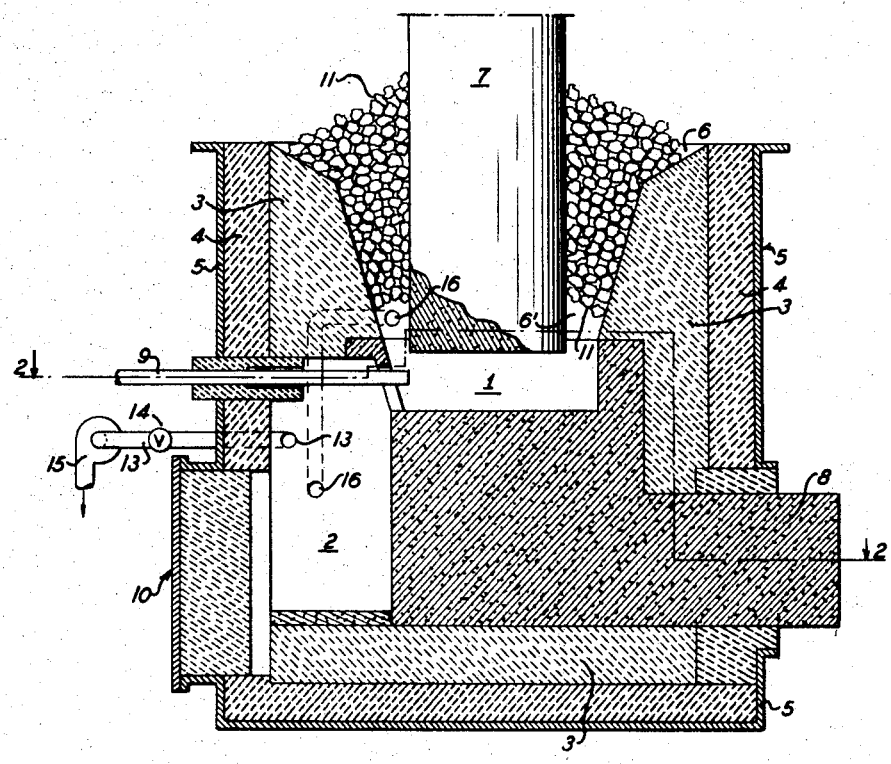

Oct. 16, 1962    E. GRUNERT    3,059,038
SMELTING FURNACES
Filed March 10, 1959

INVENTOR
ERHARD GRUNERT
BY
ATTORNEY

United States Patent Office 3,059,038
Patented Oct. 16, 1962

3,059,038
SMELTING FURNACES
Erhard Grunert, La Tronche, France, assignor to Pechiney, Compagnie de Produits Chimiques et Electrometallurgiques, Paris, France, a corporation of France
Filed Mar. 10, 1959, Ser. No. 798,366
Claims priority, application France Aug. 22, 1958
2 Claims. (Cl. 13—9)

The present invention, which is based on applicant's researches, has for its object the construction and operation of smelting furnaces (fusion, melting furnaces) and relates more particularly to electric furnaces used in the treatment of materials having very high melting points.

It is well known to tap directly molten materials contained in an electric or other furnace through a taphole situated at the base of the furnace hearth. However, when it is necessary to recover from such furnaces products having very high melting points, for example, of the order of 1800° C. and higher, it has been found extremely difficult, even impossible, to obtain normal and regular tapping; indeed, such products solidify too quickly, producing partial or even total blocking of the taphole.

Applicant's researches have led to a tapping process and to an apparatus therefor which eliminates this major inconvenience of the furnaces presently in industrial use.

The present invention has for its object a method of constructing smelting furnaces in which the tapping of molten materials is carried out "in situ"; it also relates to a furnace for carrying out said method.

Other objects of the present invention will appear in the course of the following description.

Applicant has discovered that by carrying out the tapping of materials having high-melting points, of the order of 1800° C. and higher, inside the furnace itself where the said materials are treated, there is not only obtained an easy, regular and complete tapping but, in addition, there is eventually avoided all risk of oxidation, nitriding, even of combustion of the materials. Indeed, given the very high melting temperature of these materials, their direct contact with the oxygen and nitrogen of the air can present a real danger, especially, when the said products are constituted of materials susceptible of being oxidized or nitrided, included among others are those which are obtained during a reduction treatment as, for example, and without limitation; metals and/or their alloys, metallic suboxides, metallic carbides, etc.

Applicant has further discovered that such tapping "in situ" is rendered possible by the presence inside the furnace itself, and/or close to the hearth of said furnace, of a chamber and/or an ingot mold, and/or a forehearth, etc., maintained at a high temperature, and in which the molten products are collected directly by tapping protected from the external atmosphere.

According to a preferred but non-limiting embodiment of the invention, the furnace is constructed as follows: In the bed (sole) of the furnace, close to and below the hearth, there are provided one or more chambers, herein designated forehearths, into which are tapped directly the products of the smelting operation. The forehearth or forehearths can be provided with any known apparatus for recovering (collecting) said products as, for example, an ingot mold which may or may not rest against the furnace bed.

The forehearth is maintained at a high temperature although one lower than that in the hearth itself since it is situated inside the furnace and, even, in its bed, and is also maintained under a gaseous atmosphere substantially identical to that prevailing in the treatment zone in contact with the smelting products obtained in the hearth. As a result, the said products, tapped "in situ," cool progressively in the forehearth and, in general, solidify therein without running the risk of being subjected to the undesirable reactions indicated above. Moreover, it is possible, according to the invention, to obtain a more or less slow cooling of the smelting products either by arranging the said forehearth more or less closely to the hot zone of the hearth, or by heat insulating it more or less, and/or by systematically directing into the forehearth a more or less large fraction of the hot gases generated in the furnace itself.

According to a particular embodiment of the present invention, the forehearth or forehearths are provided in the bed—either electrically conductive or not—of electric arc furnaces, resistance furnaces, or mixed furnaces.

The tapping itself of the molten products from the hearth is carried out in any known manner as, for example, by means of an auxiliary electrode which bores through (melts through, opens up) the hearth at a definite point in its lower part or close to its lowermost part. However, in the case when there are obtained in the hearth, in course of the treatment, several distinct molten products, which separate from each other by decantation, it is possible, according to the invention, to recover separately the several products by boring the hearth at several definite points and tapping the products into the forehearth or forehearths.

The forehearth is connected directly or indirectly with the outside (exterior) of the furnace by means of a simple door, which is more or less heat-insulated and tight.

The present invention, the principle of which is applicable to any furnace whether heated electrically or otherwise, such as blast furnaces, low-stack blast furnaces, electric furnaces with direct and/or indirect heating, etc., relates more particularly to electric arc and/or resistance furnaces having a conductive bed, since the very purpose of the furnace is to tap materials with very high melting points which cannot generally be obtained industrially in other types of furnaces. In the case of products having melting points, say, below 1500° C., the tapping problem is not of the same nature as of the products treated in the furnaces according to the invention, hence, they do not normally require the special arrangement described herein.

The furnaces according to the present invention can be used in all methods of treatment, electrothermal and/or electrometallurgical, continuous or batch-wise; they are constructed of materials known per se, with due regard to the particular treatments for which they are intended.

Figure 2:
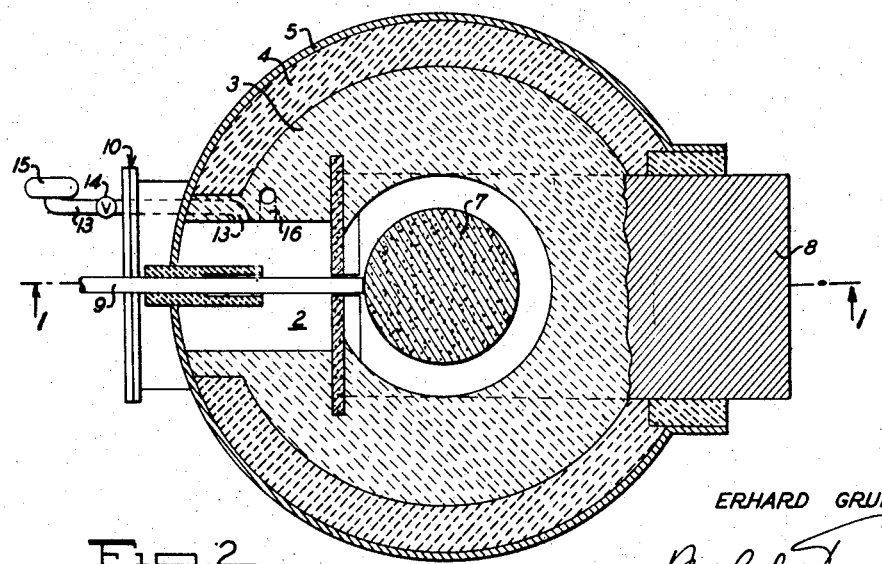

The annexed drawing, which is merely given by way of example and not by way of limitation, illustrates the various features of the method of constructing eletcric furnaces, and the furnaces themselves, according to the present invention. In the drawing FIGURE 1 is a schematic vertical section, taken along line 1—1 of FIGURE 2, of a single-phase electric furnace of the mixed arc-resistance type with conductive bed, and provided with an internal forehearth, while FIGURE 2 is a schematic sectional view of the same furnace, taken along line 2—2 of FIGURE 1.

1 designates the heath, and 2 the forehearth of the furnace, constructed of refractory materials 3 and heat insulated by means of thermal insulating material 4; the entire assembly is retained in a metallic frame 5.

The treatment and/or smelting of the products introduced into the furnace at 6 is produced directly and/or indirectly by a mixed arc-resistance heating by means of a single phase electric current passing through the hearth; the inlet of said current is through the electrode 7 and the outlet through the electrically conductive bed of the furnace 8, both formed of amorphous carbon.

Tapping of the molten products in the hearth is obtained by boring through the wall of said hearth by means of an auxiliary electrode 9; the tapped products are collected directly in the forehearth 2, and are thereafter recovered, following partial cooling and solidification, through the heat insulated door 10, which connects the said forehearth with the outside.

As mentioned above, control of the temperature prevailing in the forehearth can be obtained by directing therein a regulated amount of the gases from the furnace. This can be conveniently carried out by a duct 16 because the gases are under pressure below the charge 11. A valve 14 is disposed in the gas outlet duct 13 provided in forehearth 2. An exhaust fan 15 serves to draw the furnace gases from the upper portion 6' of the furnace through the duct 16 into the forehearth 2, eventually exhausting the gases to atmosphere.

I claim:

1. Smelting furnace comprising in combination: a furnace housing, a hearth, at least one forehearth adjacent the hearth and inside said housing, and situated below the hearth, whereby molten products in the hearth can flow by gravity into the forehearth; electrode means comprising an electrically conductive bed for producing an electric arc, said arc constituting the sole external source of heat for both the hearth and forehearth; said forehearth being positioned within said bed, whereby the forehearth is maintained at a high temperature by the heat of said bed which results from said external source of heat, and an auxiliary electrode for establishing a passage between said hearth and said forehearth.

2. A furnace according to claim 1 wherein a duct extends between the hearth and the forehearth to direct internal heat from the upper part of the furnace to the forehearth to control the temperature in said forehearth.

References Cited in the file of this patent

UNITED STATES PATENTS

| | | |
|---|---|---|
| 469,454 | Rogers | Feb. 23, 1892 |
| 706,283 | Voelker | Aug. 5, 1902 |
| 762,270 | Benjamin | June 14, 1904 |
| 1,739,343 | Baily | Dec. 10, 1929 |
| 2,892,005 | Lang et al. | June 23, 1959 |

FOREIGN PATENTS

| | | |
|---|---|---|
| 4,336 | Great Britain | Feb. 22, 1906 |